(No Model.)
A. A. HAZARD.
THILL COUPLING.
No. 505,985.          Patented Oct. 3, 1893.
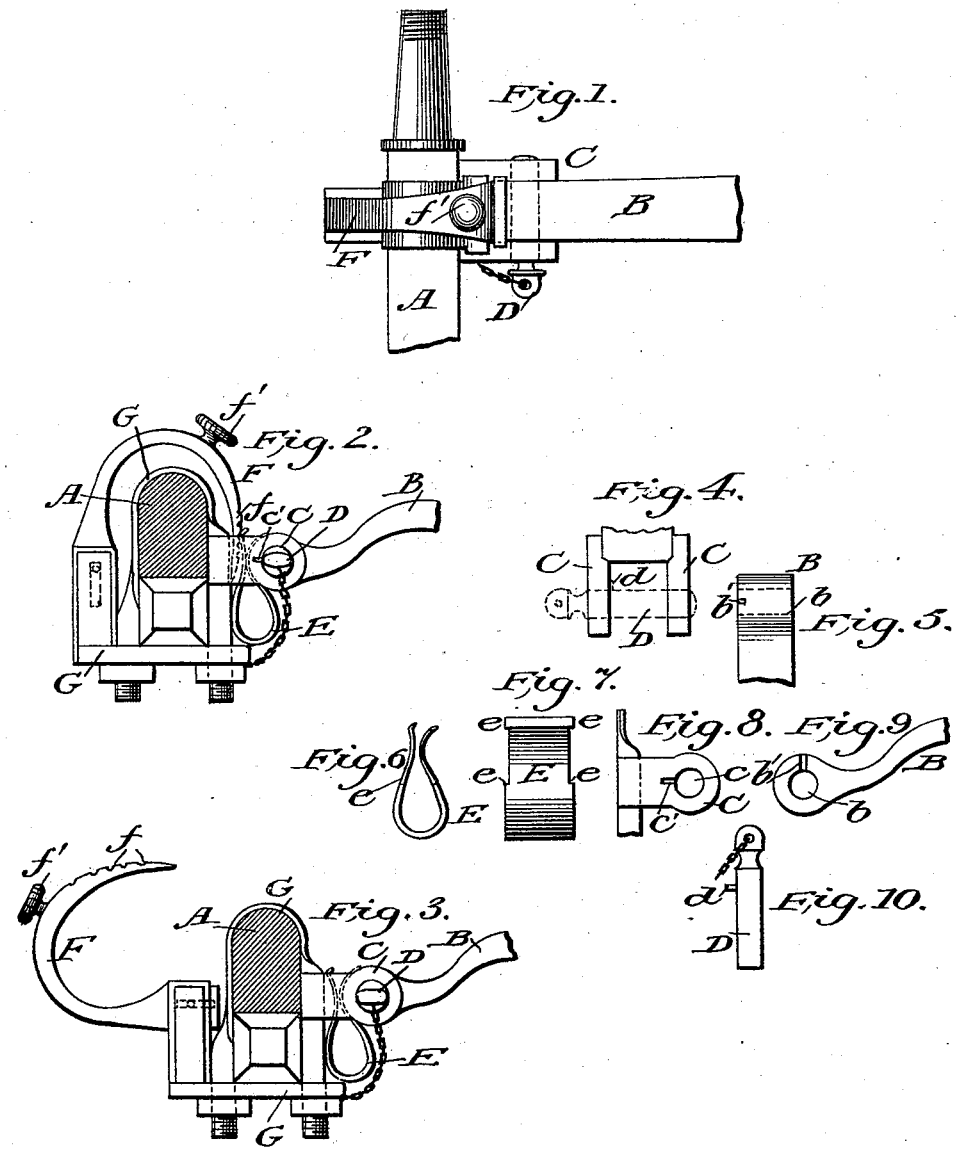
Witnesses:
D. W. Edelin
Chas. H. Baker
Inventor:
Augustus A. Hazard,
By Banning & Banning & Payson
Attorneys.

ured by the United States Patent Office.

AUGUSTUS A. HAZARD, OF COUNCIL BLUFFS, IOWA, ASSIGNOR TO M. D. HAZARD, OF SAME PLACE.

THILL-COUPLING.

SPECIFICATION forming part of Letters Patent No. 505,985, dated October 3, 1893.

Application filed August 15, 1890. Serial No. 362,134. (No model.)

*To all whom it may concern:*

Be it known that I, AUGUSTUS A. HAZARD, a citizen of the United States, residing at Council Bluffs, Pottawattamie county, Iowa, have invented a new and useful Improvement in Carriage-Shaft Clips, of which the following is a specification.

The object of my improvement is to provide an easily operated clip, by means whereof a pair of shafts may be put on or taken off a vehicle without its being necessary to remove the wheel or any nuts or bolts; and the invention consists in the features and details of construction hereinafter described and claimed.

In the drawings, Figure 1 is a plan view of the end of one of a pair of shafts showing its attachment to the axle; Fig. 2 a side elevation of Fig. 1 with the lock closed; Fig. 3 a similar view with the lock open; Figs. 4 to 10 detail views of portions of the device.

A is the axle; B the thill iron; C the jaws between which the clip is supported; D the fastening pin; E a curved spring; and F the locking mechanism.

The thill iron B is made of wrought iron or other suitable material, preferably of the shape shown in the drawings, being provided with a hole $b$ and a slot $b'$, and is adapted to be fastened in any suitable way to one side of a pair of shafts, a similar thill iron being attached to the other side. To the axle I secure, preferably by means of bolts, a frame or clip G, and integral with or attached to this, I provide a pair of jaws C having holes $c$ and a slot $c'$. The thill iron is placed between these jaws, and is fastened by means of a pin D provided with a lug or pin $d$. In putting the parts together, the thill iron is inserted between the jaws with the hole $b$ in alignment with the holes $c$ and the pin D then passed through these holes. As the pin passes the hole the pin $d$ passes through the slot $c'$. The shafts may then be raised to bring the slot $b'$ opposite the slot $c'$. If the pin D be then pressed farther in, the pin $d$ will enter and engage with the slot $b'$, the shafts being then lowered, the pin D will be turned by the above described engagement of the small pin and slot locking the thill iron in place, as it will be evident that it will be impossible to withdraw the pin D until the thill iron has been sufficiently turned back and raised to bring the pin $d$ opposite the slot $c'$. By means of this device all possibility of the clips becoming disengaged from the vehicle is obviated. I next construct the spring E, preferably of the form shown in Figs. 6 and 7, where it is provided with shoulders $e$. This spring is inserted between the jaws C immediately back of the clip, as shown, with the shoulders $e$ passing one above and the other beneath these jaws, thereby serving to hold the spring in position, and serves to hold the parts tightly, preventing any rattling for which reason I term it an anti-rattler spring. To adjust the tension of this spring and hold it in place, I provide a lock F journaled in the clip G. This lock F is made of any suitable material, and somewhat C shaped, as shown. It is pivoted between two supports attached to the clip in the rear of the axle, in such a manner that it can swing forward and backward over the same, entering between the jaws C and behind the spring E. The lock tapers at its front end and is also provided with a number of notches or serrations $f$ which engage, as shown, in the rearward end of the spring which, as shown in Fig. 14, is bent into a suitable form to engage with such notches. The spring and thill iron being inserted in place and the pin D passed through, as above described, the lock F may be swung forward upon its journals and its tapering point forced down between the clip G and the spring E. The farther it is forced in the tighter it will hold the parts, and its notches engaging with the edge of the spring E will serve to lock it firmly. When it is desired to take the device apart, the lock may be pulled back by means of a knob $f$, the thill iron then raised and the pin D withdrawn.

I claim—

1. In a carriage shaft clip, the combination of the thill iron B, provided with a hole $b$ and a slot $b'$, jaws C provided with a hole $c$ and a slot $c'$, a pin D provided with a lug $d$ adapted as the pin is inserted in place to pass through the slot $c'$ and engage with the slot $b'$ a spring E placed between the jaws and behind the thill iron, and a serrated lock F adapted to engage with such spring to lock the parts together, substantially as described.

2. In a carriage shaft clip, the combination of a thill iron B; jaws C for supporting the same; pin D; spring E for holding the parts together and preventing rattling; and a serrated lock F adapted to engage with such spring, to lock the same in place substantially as described.

3. In a carriage shaft clip, the combination of a spring E, and a tapering serrated lock F, such lock being pivoted behind the axle and swinging forward over the same, its point entering behind the spring and its serrations engaging with the rearward edge thereof, substantially as described.

4. In a carriage shaft clip, the combination of a thill-iron B, jaws C, pin D, spring E having shoulders engaging with the jaws on the top and bottom thereof, and a serrated lock F engaging with such spring, substantially as described.

AUGUSTUS A. HAZARD.

Witnesses:
S. M. WILLIAMSON,
O. C. FINDLEY.